US010459190B2

(12) United States Patent
Suzuki et al.

(10) Patent No.: US 10,459,190 B2
(45) Date of Patent: Oct. 29, 2019

(54) IMAGING APPARATUS, IMAGING METHOD, AND COMPUTER-READABLE RECORDING MEDIUM

(71) Applicant: Olympus Corporation, Hachioji-shi, Tokyo (JP)

(72) Inventors: Takeshi Suzuki, Akiruno (JP); Keiji Kunishige, Hachioji (JP); Akira Yukitake, Kokubunji (JP); Takeshi Kawawa, Hachioji (JP); Yoichiro Okumura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/992,053

(22) Filed: May 29, 2018

(65) Prior Publication Data
US 2018/0348470 A1 Dec. 6, 2018

(30) Foreign Application Priority Data

Jun. 5, 2017 (JP) .................................. 2017-111085

(51) Int. Cl.
*G02B 7/09* (2006.01)
*H04N 5/232* (2006.01)
(Continued)

(52) U.S. Cl.
CPC ............ *G02B 7/09* (2013.01); *G06F 3/0416* (2013.01); *G06K 9/3241* (2013.01); *G06T 7/11* (2017.01); *H04N 5/23212* (2013.01); *H04N 5/23216* (2013.01); *H04N 5/23218* (2018.08); *H04N 5/23219* (2013.01); *H04N 5/23229* (2013.01); *H04N 5/23245* (2013.01);
(Continued)

(58) Field of Classification Search
None
See application file for complete search history.

(56) References Cited

U.S. PATENT DOCUMENTS

2007/0018069 A1* 1/2007 Higashino .............. G03B 13/36
250/200
2017/0366743 A1* 12/2017 Park ...................... G06F 3/0484
(Continued)

FOREIGN PATENT DOCUMENTS

JP 2011-030008 2/2011

*Primary Examiner* — Cynthia Segura
(74) *Attorney, Agent, or Firm* — John C. Pokotylo; Pokotylo Patent Services

(57) ABSTRACT

An imaging apparatus includes: an imaging unit; an image clipping unit configured to clip a predetermined area from each of images; an analyzing unit configured to analyze the sequentially clipped predetermined areas and generate an analysis result indicating an identified subject; an autofocus (AF) target determination unit configured to determine an AF target in the images based on the analysis result; an AF mode determination unit configured to select and determine an optimal AF mode based on the analysis result and a determination result; a touch panel; an input detection unit; and an imaging control unit configured to repeat control of moving a position of the predetermined area, causing the analyzing unit to analyze the predetermined area of a latest image, causing the AF target determination unit to determine the AF target, and causing the AF mode determination unit to select and determine the optimal AF mode.

8 Claims, 14 Drawing Sheets

(51) Int. Cl.
*G06T 7/11* (2017.01)
*G06K 9/32* (2006.01)
*G06F 3/041* (2006.01)
*G02B 7/36* (2006.01)

(52) U.S. Cl.
CPC . H04N 5/232127 (2018.08); H04N 5/232945 (2018.08); *G02B 7/36* (2013.01)

(56) References Cited

U.S. PATENT DOCUMENTS

| | | | | |
|---|---|---|---|---|
| 2018/0220062 A1* | 8/2018 | Funatsu | ................ | G06F 3/0485 |
| 2018/0224723 A1* | 8/2018 | Inai | ........................ | G03B 17/20 |
| 2018/0324351 A1* | 11/2018 | Yoshimoto | ............. | G03B 17/02 |
| 2019/0014256 A1* | 1/2019 | Ogawa | ....................... | G01S 3/00 |

* cited by examiner

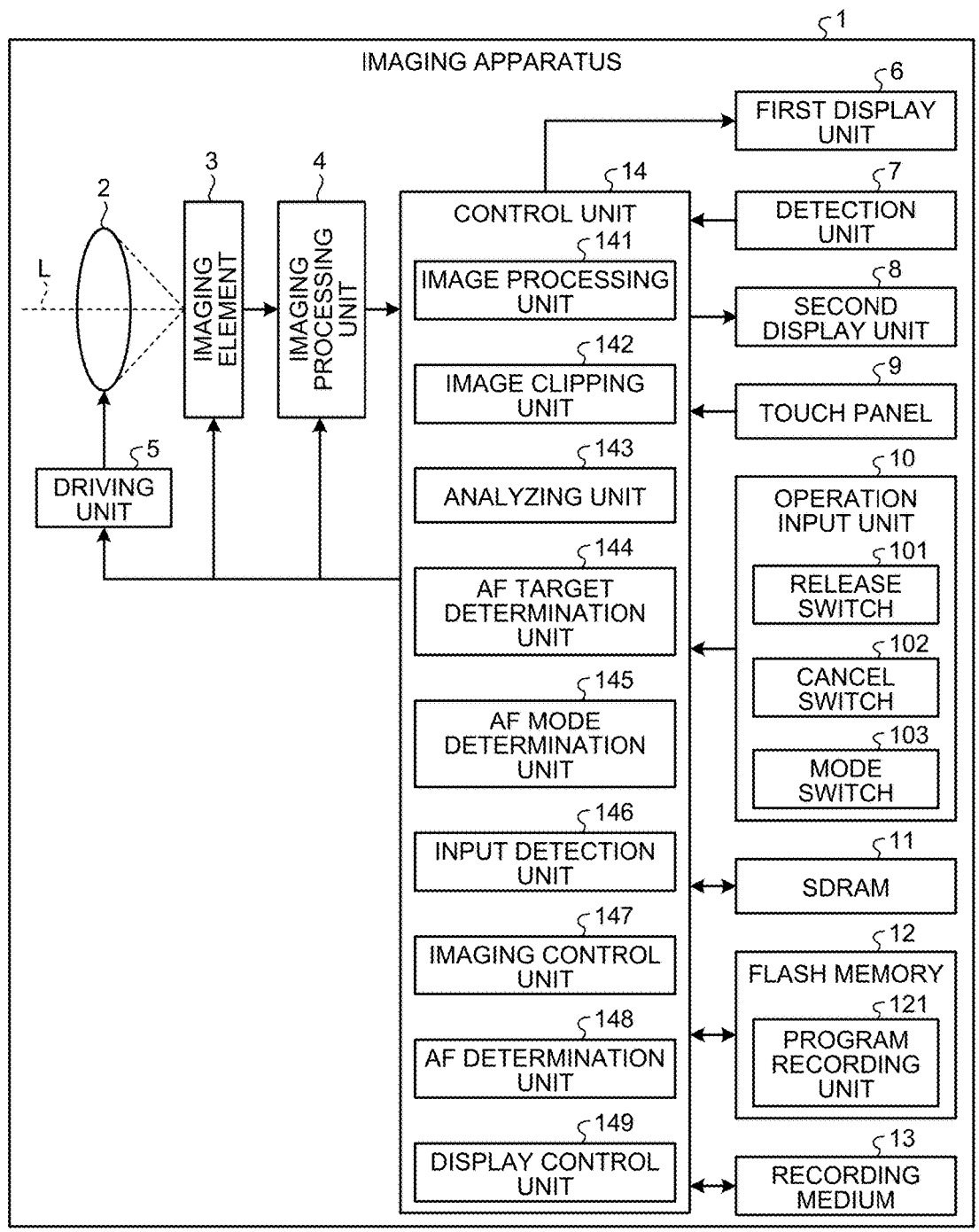

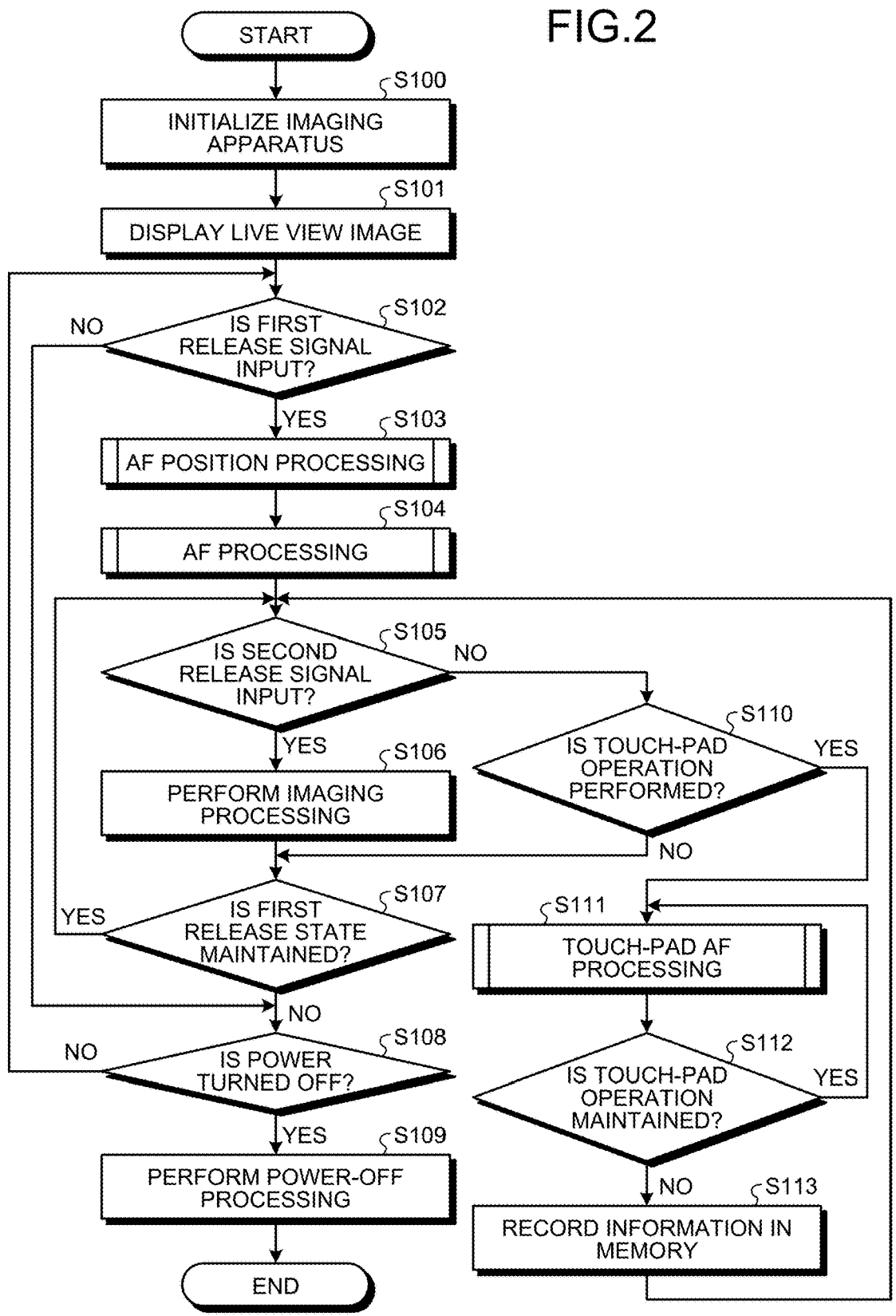

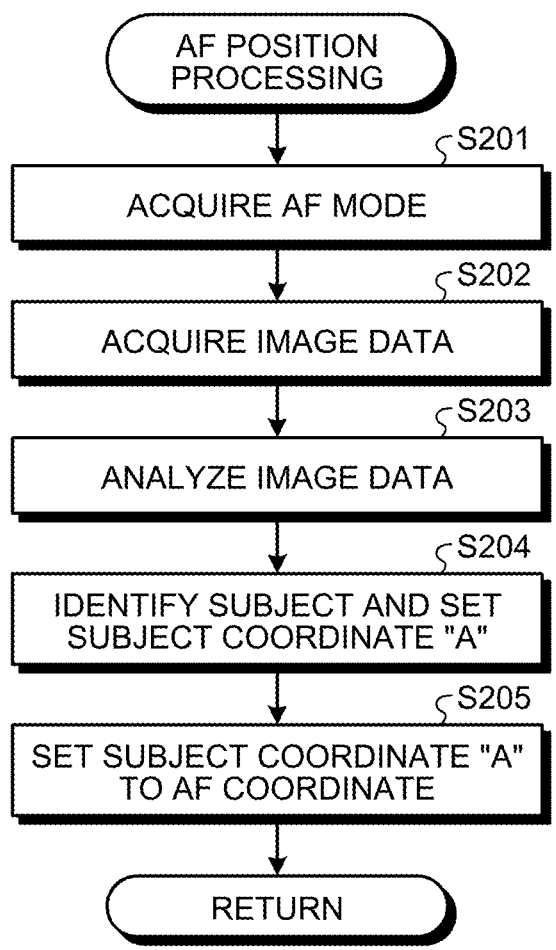

IMAGING APPARATUS, IMAGING METHOD, AND COMPUTER-READABLE RECORDING MEDIUM

CROSS-REFERENCE TO RELATED APPLICATIONS

This application is based upon and claims the benefit of priority from Japanese Patent Application No. 2017-111085, filed on Jun. 5, 2017, the entire contents of which are incorporated herein by reference.

BACKGROUND

The present disclosure relates to an imaging apparatus, an imaging method, and a computer-readable recording medium.

In recent years, there is a known technique in which a touch panel is provided on a display screen of a display unit that displays an image in an imaging apparatus, such as a digital camera, and a user is allowed to operate the imaging apparatus using the touch panel (for example, JP 2011-30008 A). In this technique, an autofocus (AF) mode of the imaging apparatus is set by switching to one of a touch fixing focus mode, in which a focus position of the imaging apparatus is fixed to a touch position, and a touch tracking focus mode, in which a subject at the touch position is tracked, in conjunction with designation by touching a subject in an image displayed on the display unit.

SUMMARY

An imaging apparatus according to one aspect of the present disclosure includes: an imaging unit configured to successively image a subject and sequentially generate image data; an image clipping unit configured to clip a predetermined area that is set in advance from each of images corresponding to the image data sequentially generated by the imaging unit; an analyzing unit configured to analyze the predetermined areas sequentially clipped by the image clipping unit and generate an analysis result indicating an identified subject; an autofocus (AF) target determination unit configured to determine an AF target in the images based on the analysis result generated by the analyzing unit; an AF mode determination unit configured to select and determine an optimal AF mode from among a plurality of AF modes set in advance, based on the analysis result generated by the analyzing unit and a determination result of determination performed by the AF target determination unit; a touch panel configured to detect a touch position of an external object and output a coordinate signal indicating the touch position; an input detection unit configured to output an operation signal that is obtained by converting the coordinate signal output by the touch panel to a relative coordinate with an origin at the predetermined area; and an imaging control unit configured to, every time the touch panel outputs the coordinate signal in accordance with a change in the touch position, repeat control of moving a position of the predetermined area to be clipped from the images by the image clipping unit based on the operation signal output by the input detection unit, and thereafter, causing the analyzing unit to analyze the predetermined area of a latest image corresponding to latest image data generated by the imaging unit, causing the AF target determination unit to determine the AF target, and causing the AF mode determination unit to select and determine the optimal AF mode.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a functional configuration of an imaging apparatus according to a first embodiment;

FIG. 2 is a flowchart illustrating an outline of processing performed by the imaging apparatus according to the first embodiment;

FIG. 5 is a flowchart illustrating an outline of AF position processing in FIG. 2;

DETAILED DESCRIPTION

Figure 3A:
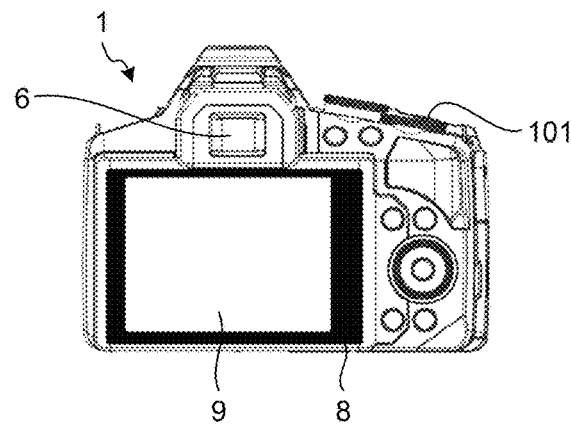
FIG. 3A is a schematic view for explaining operation performed on the imaging apparatus by a user.

Embodiments will be described below. The present disclosure is not limited by the embodiments below. The same components are denoted by the same reference signs throughout the drawings. In the following description, a digital camera capable of successively capturing image data will be described as an example of an imaging apparatus; however, the present disclosure is applicable to any of a camcorder, a digital video camera, a mobile phone and a tablet terminal with imaging functions, a security camera, an integrated circuit (IC) recorder with an imaging function, an endoscope, and a microscope such as a video microscope, instead of the digital camera.

First Embodiment

Configuration of Imaging Apparatus

FIG. 1 is a block diagram illustrating a functional configuration of an imaging apparatus according to a first embodiment. An imaging apparatus 1 illustrated in FIG. 1 is an apparatus that generates image data by imaging a subject and displays or records an image corresponding to the image data.

As illustrated in FIG. 1, the imaging apparatus 1 includes an optical system 2, an imaging element 3, an imaging processing unit 4, a driving unit 5, a first display unit 6, a detection unit 7, a second display unit 8, a touch panel 9, an operation input unit 10, a synchronous dynamic random access memory (SDRAM) 11, a flash memory 12, a recording medium 13, and a control unit 14.

The optical system 2 is configured with a plurality of lenses, a shutter, a diaphragm, and the like, and forms a subject image on a light receiving surface of the imaging element 3. The optical system 2 has at least a focus function to adjust a focus position. It is of course possible to provide a zoom function to change an angle of view in the optical system 2.

The imaging element 3 receives light of the subject image formed by the optical system 2 and performs photoelectric conversion to successively generate image data of the subject, and sequentially outputs the generated image data to the imaging processing unit 4 under the control of the control unit 14. The imaging element 3 is configured with an image sensor, such as a charge coupled device (CCD) or a complementary metal oxide semiconductor (CMOS).

The imaging processing unit 4 performs analog processing, such as gain adjustment processing, on the image data input from the imaging element 3, subsequently performs analog-to-digital (A/D) conversion processing to convert analog image data to digital image data (RAW data), and outputs the digital image data to the control unit 14 under the control of the control unit 14. The imaging processing unit 4 is configured with a gain adjustment circuit, an A/D conversion circuit, or the like.

The driving unit 5 moves the optical system 2 along an optical axis L to adjust the focus position of the imaging apparatus 1 under the control of the control unit 14. The driving unit 5 is configured with a stepping motor, a voice coil motor, or the like. In the first embodiment, the optical system 2, the imaging element 3, the imaging processing unit 4, and the driving unit 5 function as an imaging unit.

The first display unit 6 displays an image corresponding to image data input from the control unit 14 and various kinds of information on the imaging apparatus 1 under the control of the control unit 14. The first display unit 6 is configured with a display panel made of liquid crystal, organic electro luminescence (EL), or the like, an enlarging optical system that enlarges an image displayed on the display panel, or the like. The first display unit 6 is provided on a back side of the imaging apparatus 1 and on an upper surface side of the imaging apparatus 1, e.g., in a viewfinder. That is, the first display unit 6 functions as an electric viewfinder (EVF).

The detection unit 7 detects a user (object) approaching the first display unit 6, and outputs a detection result to the control unit 14. The detection unit 7 is configured with an infrared sensor, an eye sensor, or the like. The detection unit 7 is provided in the vicinity of the first display unit 6.

The second display unit 8 displays an image corresponding to image data input from the control unit 14 under the control of the control unit 14. The second display unit 8 also displays various kinds of information on the imaging apparatus 1. The second display unit 8 is configured with a display panel made of liquid crystal, organic EL, or the like. The second display unit 8 has a larger display area than a display area of the first display unit 6. The second display unit 8 is provided on the back side of the imaging apparatus 1.

The touch panel 9 is provided on the display area of the second display unit 8 in an overlapping manner, and configured to detect a touch position touched by an external object (for example, a finger of a user) and output a coordinate signal indicating the touch position to the control unit 14. Here, the coordinate signal is a coordinate system with the x-axis along the horizontal direction of the second display unit 8, the y-axis along the vertical direction of the second display unit 8, and the origin at the center of the second display unit 8.

The operation input unit 10 receives input of various kinds of operation related to the imaging apparatus 1, and outputs contents of the received operation to the control unit 14. The operation input unit 10 is configured with a directional pad, a jog dial, a button, a switch, or the like. Specifically, the operation input unit 10 includes, in the imaging apparatus 1, a release switch 101 for receiving input of a first release signal and a second release signal, a cancel switch 102 for receiving input of a cancel signal for designating cancellation of various kinds of operation, and a mode switch 103 for receiving input of a mode signal for designating a mode. The release switch 101 is able to shift between a first state and a second state such that the release switch 101 shifts to the first state and outputs the first release signal when pressed halfway by a user, and shifts to the second state and outputs the second release signal when fully pressed by the user.

The SDRAM 11 temporarily stores data and information being processed by the imaging apparatus 1. For example, the SDRAM 11 functions as a frame memory by temporarily storing image data sequentially input from the control unit 14.

The flash memory 12 includes a program recording unit 121 that records a program executed by the imaging apparatus 1. Further, the flash memory 12 records various parameters of processing performed by the imaging apparatus 1.

The recording medium 13 is removably connected to the imaging apparatus 1 via a memory interface (I/F) (not illustrated), and records image data input from the control unit 14. Further, the recording medium 13 outputs the image data recorded by the memory I/F (not illustrated) to the control unit 14.

The control unit 14 comprehensively controls each of the units of the imaging apparatus 1. The control unit 14 is configured with a central processing unit (CPU), an application specific integrated circuit (ASIC), or the like. The control unit 14 includes an image processing unit 141, an image clipping unit 142, an analyzing unit 143, an AF target determination unit 144, an AF mode determination unit 145, an input detection unit 146, an imaging control unit 147, an AF determination unit 148, and a display control unit 149.

The image processing unit 141 performs predetermined processing on the digital image data input from the imaging processing unit and outputs the processed image data to the first display unit 6 or the second display unit 8 under the control of the display control unit 149 to be described later. Examples of the predetermined image processing herein include demosaicing processing, white balance processing, gamma correction processing, and synchronization processing.

The image clipping unit 142 clips a predetermined area that is set in advance from an image corresponding to the image data sequentially input from the imaging processing unit 4, and outputs the predetermined area to the analyzing unit 143 under the control of the display control unit 149 to be described later. Here, the predetermined area set in advance is any of a central area of the image, an area including a position set by the operation input unit, and an area including a touch position touched on the touch panel 9.

The analyzing unit 143 analyzes the predetermined areas that are sequentially clipped by the image clipping unit 142, generates an analysis result indicating an identified subject, and outputs the analysis result to each of the AF target determination unit 144 and the AF mode determination unit 145. Specifically, the analyzing unit 143 identifies the subject by analyzing one or more of a luminance component, a feature amount, and a motion vector included in image data that is included in the predetermined areas that are sequentially clipped by the image clipping unit 142, based on template information on the subject recorded in the flash memory 12 or based on a discriminator learned in advance.

The AF target determination unit 144 determines an AF target in the image based on the analysis result generated by the analyzing unit 143. Specifically, the AF target determination unit 144 determines an AF target subject to be focused on by the optical system 2 based on the analysis result generated by the analyzing unit 143.

The AF mode determination unit 145 selects and determines an optimal AF mode from among a plurality of AF modes set in advance, based on the analysis result generated by the analyzing unit 143 and a determination result obtained by the AF target determination unit 144.

The input detection unit 146 outputs, to the imaging control unit 147, an operation signal that is obtained by converting the coordinate signal output from the touch panel 9 to relative coordinates with the origin at the center of the predetermined area that is clipped from the image by the image clipping unit 142.

Every time the touch panel 9 outputs the coordinate signal along with a change in the touch position, the imaging control unit 147 repeats a process of moving a position of a predetermined area to be clipped from an image by the image clipping unit 142 based on the operation signal output by the input detection unit 146, causing the analyzing unit 143 to analyze the predetermined area of the latest image corresponding to the latest image data generated by the imaging element 3, causing the AF target determination unit 144 to determine an AF target, and causing the AF mode determination unit 145 to select and determine an optimal AF mode. Further, the imaging control unit 147 performs AF control of setting the focus position of the optical system 2 to a predetermined position by moving the optical system 2 along the optical axis L by driving the driving unit 5.

The AF determination unit 148 determines whether the focus position of the optical system 2 is set to the predetermined position based on the image data input from the imaging processing unit 4. For example, the AF determination unit 148 determines whether the focus position of the optical system 2 is set to the predetermined position based on contrast of the image data.

The display control unit 149 controls a display mode of each of the first display unit 6 and the second display unit 8. Specifically, the display control unit 149 displays, on the first display unit 6, an image or a live view image corresponding to image data subjected to image processing by the image processing unit 141 when the detection unit 7 detects a user as a subject, and displays, on the second display unit 8, an image or a live view image corresponding to image data subjected to image processing by the image processing unit 141 when the detection unit 7 does not detect a user as a subject. Further, the display control unit 149 changes any one of a size, a shape, and a color of a focus frame depending on a temporal change of the operation signal input from the input detection unit 146, and displays the focus frame on the first display unit 6 or the second display unit 8.

Processing Performed by Imaging Apparatus

Next, processing performed by the imaging apparatus 1 will be described. FIG. 2 is a flowchart illustrating an outline of processing performed by the imaging apparatus 1. FIG. 3A to FIG. 3F are schematic views for explaining operation that is performed on the imaging apparatus 1 by a user. FIG. 4A to FIG. 4G are schematic views for explaining examples of an image displayed on the first display unit 6. In the following, processing performed when a user performs imaging while viewing a live view image displayed on the first display unit 6 will be described.

As illustrated in FIG. 2, first, when power of the imaging apparatus 1 is turned on, the imaging control unit 147 initializes the imaging apparatus 1 (Step S100). In this case, the imaging control unit 147 sets the AF mode of the imaging apparatus 1 to a face AF mode in which a face of a subject is focused on.

Figure 4A:
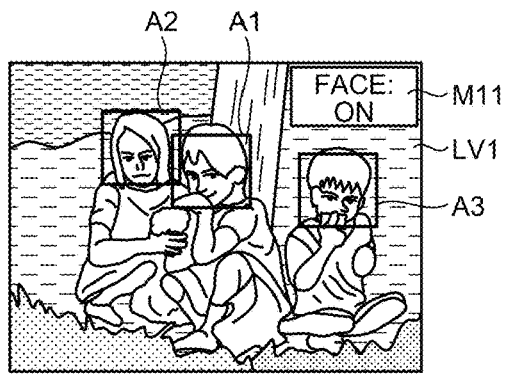
FIG. 4A is a schematic view for explaining an example of an image displayed by a first display unit included in the imaging apparatus according to the first embodiment.

Subsequently, the display control unit 149 displays, on the first display unit 6, a live view image corresponding to image data that is generated through imaging by the imaging element 3 (Step S101). Specifically, as illustrated in FIG. 3A and FIG. 4A, when the detection unit 7 detects the user, the display control unit 149 displays a live view image LV1 corresponding to image data generated through imaging by the imaging element 3 on the first display unit 6. In this case, the display control unit 149 displays information M11 (for example, face: ON) related to the AF mode of the imaging apparatus 1 and focus frames A1 to A3 of areas including faces of a plurality of subjects, which are candidates to be an AF target, in a superimposed manner on the live view image LV1 on the first display unit 6.

Figure 3B:
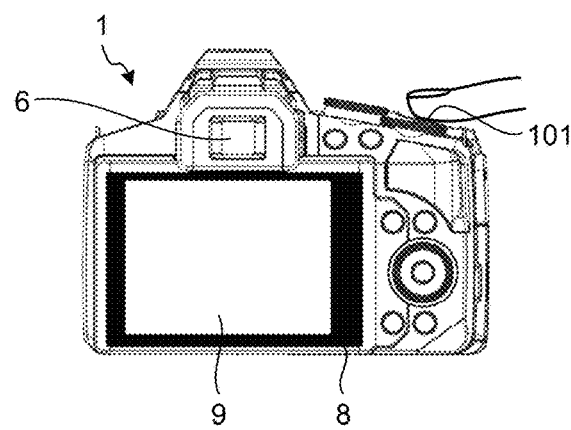
FIG. 3B is a schematic view for explaining operation performed on the imaging apparatus by the user.

Subsequently, if the first release signal is input from the release switch 101 of the operation input unit 10 (Yes at Step S102), the imaging apparatus 1 performs AF position processing for setting an AF position (Step S103). Specifically, as illustrated in FIG. 3A and FIG. 3B, if the user presses the release switch 101 halfway and the first release signal is input from the release switch 101 (FIG. 3A to FIG. 3B), the imaging apparatus 1 performs the AF position processing for setting the AF position. After Step S103, the imaging apparatus 1 proceeds to Step S104 to be described later. In the first embodiment, the imaging apparatus 1 performs the AF position processing for setting the AF position when the first release signal is input from the release switch 101, but the embodiments are not limited thereto. For example, the imaging apparatus 1 may perform the AF position processing for setting the AF position in accordance with a signal input from a function key or a signal input from an AF lock button. In contrast, if the first release signal is not input from the release switch 101 of the operation input unit 10 (No at Step S102), the imaging apparatus 1 proceeds to Step S108 to be described later.

Outline of AF Position Processing

FIG. 5 is a flowchart illustrating an outline of the AF position processing at Step S103 in FIG. 2.

As illustrated in FIG. 5, the imaging control unit 147 acquires a current AF mode of the imaging apparatus 1, which is stored in the SDRAM 11 (Step S201).

Subsequently, the imaging control unit 147 causes the analyzing unit 143 to acquire the image data generated by the imaging element 3 from the SDRAM 11 (Step S202), and causes the analyzing unit 143 to analyze the image data (Step S203). In this case, the analyzing unit 143 analyzes a predetermined area that the image clipping unit 142 has clipped from the image data, and generates an analysis result indicating an identified subject. It is of course possible for the analyzing unit 143 to analyze the whole area of the image corresponding to the image data and generates an analysis result indicating an identified subject.

Thereafter, the imaging control unit 147 causes the AF target determination unit 144 to identify the subject and set a subject coordinate "A" indicating a position of the subject in the image based on the analysis result that is obtained through the analysis by the analyzing unit 143 (Step S204), and causes the AF target determination unit 144 to set the subject coordinate "A" to an AF coordinate "T", to which the focus position of the optical system 2 is set (Step S205). In this case, the AF target determination unit 144 records the AF coordinate "T" in the SDRAM 11. After Step S205, the imaging apparatus 1 returns to the main routine in FIG. 2.

Referring back to FIG. 2, processes from Step S104 will be described.

At Step S104, the imaging apparatus 1 performs AF processing for causing the optical system 2 to focus on the subject identified at Step S103 as described above. After Step S104, the imaging apparatus 1 proceeds to Step S105 to be described later.

Outline of AF Processing

Figure 6:
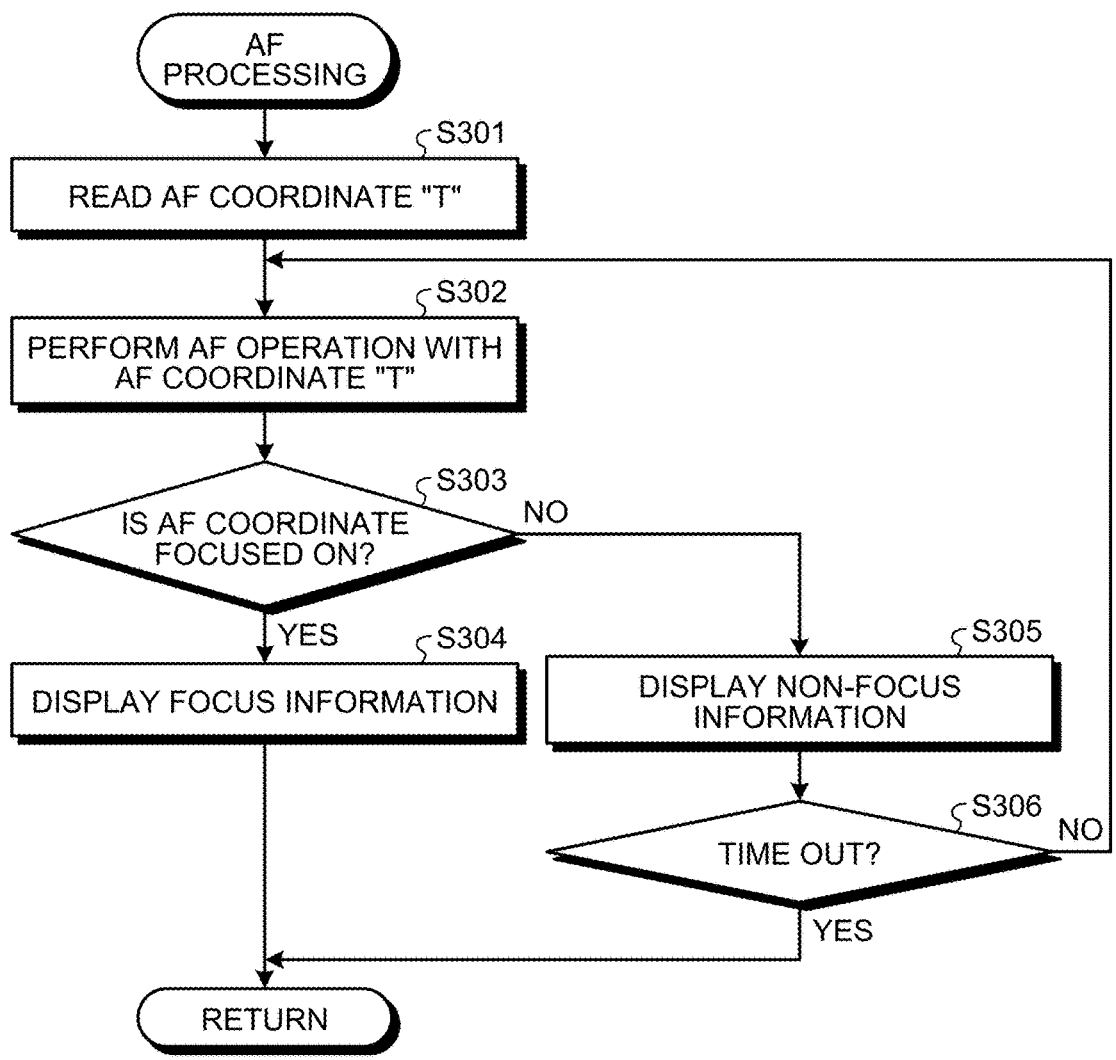
FIG. 6 is a flowchart illustrating an outline of AF processing in FIG. 2.

FIG. 6 is a flowchart illustrating an outline of the AF processing at Step S104 in FIG. 2.

As illustrated in FIG. 6, the imaging control unit 147 acquires the AF coordinate "T" from the SDRAM 11 (Step S301), and performs AF operation such that the focus position of the optical system 2 is set to the AF coordinate "T" by moving the optical system 2 along the optical axis L by driving the driving unit 5 (Step S302). In this case, the imaging control unit 147 causes the imaging element 3 to sequentially generate image data.

Subsequently, the AF determination unit 148 determines whether the imaging apparatus 1 is focusing on the AF coordinate "T" based on the image data generated by the imaging element 3 (Step S303). For example, the AF determination unit 148 determines whether an amount of contrast of the AF coordinate "T" of the image corresponding to the image data has reached a maximum value. If the imaging element 3 is provided with an image plane phase difference AF pixel, the AF determination unit 148 may determine whether the AF coordinate "T" is focused on based on two signals output from the image plane phase difference AF pixel. If the AF determination unit 148 determines that the imaging apparatus 1 is focusing on the AF coordinate "T" (Yes at Step S303), the imaging apparatus 1 proceeds to Step S304 to be described later. In contrast, if the AF determination unit 148 determines that the imaging apparatus 1 is focusing on the AF coordinate "T" (No at Step S303), the imaging apparatus 1 proceeds to Step S305 to be described later.

Figure 4B:
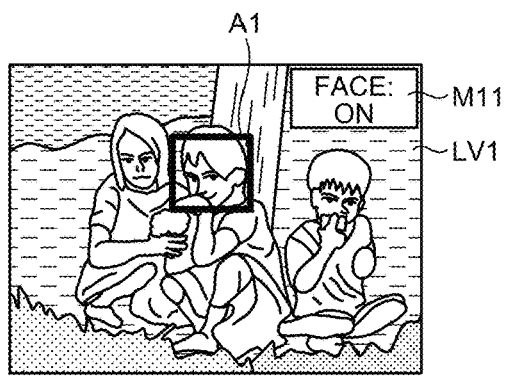
FIG. 4B is a schematic view for explaining an example of an image displayed by the first display unit included in the imaging apparatus according to the first embodiment.

At Step S304, the display control unit 149 displays, on the first display unit 6, focus information, which indicates that the imaging apparatus 1 is focusing on the AF coordinate "T", in a superimposed manner on the live view image displayed on the first display unit 6. Specifically, as illustrated in FIG. 4B, when the AF mode of the imaging apparatus 1 is set to the face AF mode, the display control unit 149 displays the focus frame A1 indicating an area including the face in a superimposed and highlighted manner on the live view image LV1 on the first display unit 6 (for example, a white frame is changed to a green frame as highlighted display). Accordingly, the user can intuitively recognize that the imaging apparatus 1 is focusing on the AF coordinate "T". The imaging apparatus 1 may give a notice indicating that the AF coordinate "T" is focused on by using sound or the like in addition to the display. After Step S304, the imaging apparatus 1 returns to the main routine in FIG. 2 described above.

At Step S305, the display control unit 149 displays, on the first display unit 6, non-focus information, which indicates that the imaging apparatus 1 is not focusing on the AF coordinate "T", in a superimposed manner on the live view image displayed on the first display unit 6. For example, when the AF mode of the imaging apparatus 1 is set to the face AF mode, the display control unit 149 displays only a frame indicating an area including the face in a superimposed manner on the first display unit 6 (for example, only a white frame is displayed). Accordingly, the user can intuitively recognize that the imaging apparatus 1 is not focusing on the AF coordinate "T".

Subsequently, if a predetermined time has elapsed after the imaging apparatus 1 has performed the AF processing (Yes at Step S306), the imaging apparatus 1 returns to the main routine in FIG. 2 described above. In contrast, if the predetermined time has not elapsed after the imaging apparatus 1 has performed the AF processing (No at Step S306), the imaging apparatus 1 returns to Step S302 described above.

Referring back to FIG. 2, processes from Step S105 will be described.

At Step S105, if the second release signal for designating imaging is input from the operation input unit 10 (Yes at Step S105), the imaging control unit 147 performs imaging processing (Step S106). Specifically, the imaging control unit 147 causes the imaging element 3 to perform imaging and generate image data, and causes the image processing unit 141 to perform image processing on the image data generated by the imaging element 3 and record the image data in the recording medium 13.

Subsequently, if the operation input unit 10 is maintained in a first release state (Yes at Step S107), the imaging apparatus 1 returns to Step S105 described above. In contrast, if the operation input unit 10 is not maintained in the first release state (No at Step S107), the imaging apparatus 1 proceeds to Step S108 described below.

At Step S108, if an instruction signal for turning off the power of the imaging apparatus 1 is input from the operation input unit 10 (Yes at Step S108), the imaging apparatus 1 performs power-off processing (Step S109), and terminates the processing. For example, the imaging apparatus 1 records a last imaging parameter in the flash memory 12, and causes the driving unit 5 to move the optical system 2 to the initial position.

At Step S108, if the instruction signal for turning off the power of the imaging apparatus 1 is not input from the operation input unit 10 (No at Step S108), the imaging apparatus 1 returns to Step S102 described above.

At Step S105, if the second release signal indicating imaging is not input from the operation input unit 10 (No at Step S105), the imaging apparatus 1 proceeds to Step S110 described below.

Figure 3C:
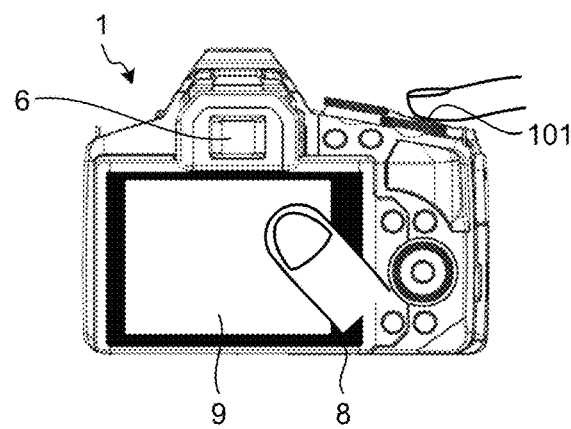
FIG. 3C is a schematic view for explaining operation performed on the imaging apparatus by the user.

At Step S110, if touch-pad operation is performed on the touch panel 9 (Yes at Step S110), the imaging apparatus 1 proceeds to Step S111 to be described later. Specifically, as illustrated in FIG. 3C, if the user performs touch-pad operation on the touch panel 9 (FIG. 3B to FIG. 3C), the imaging apparatus 1 proceeds to Step S111 to be described later. In contrast, if the touch-pad operation is not performed on the touch panel 9 (No at Step S110), the imaging apparatus 1 proceeds to Step S107.

At Step S111, the imaging apparatus 1 performs touch-pad AF processing for changing each of the AF target and the AF mode in accordance with the coordinate signal input from the touch panel 9.

Outline of Touch-Pad AF Processing

Figure 7:
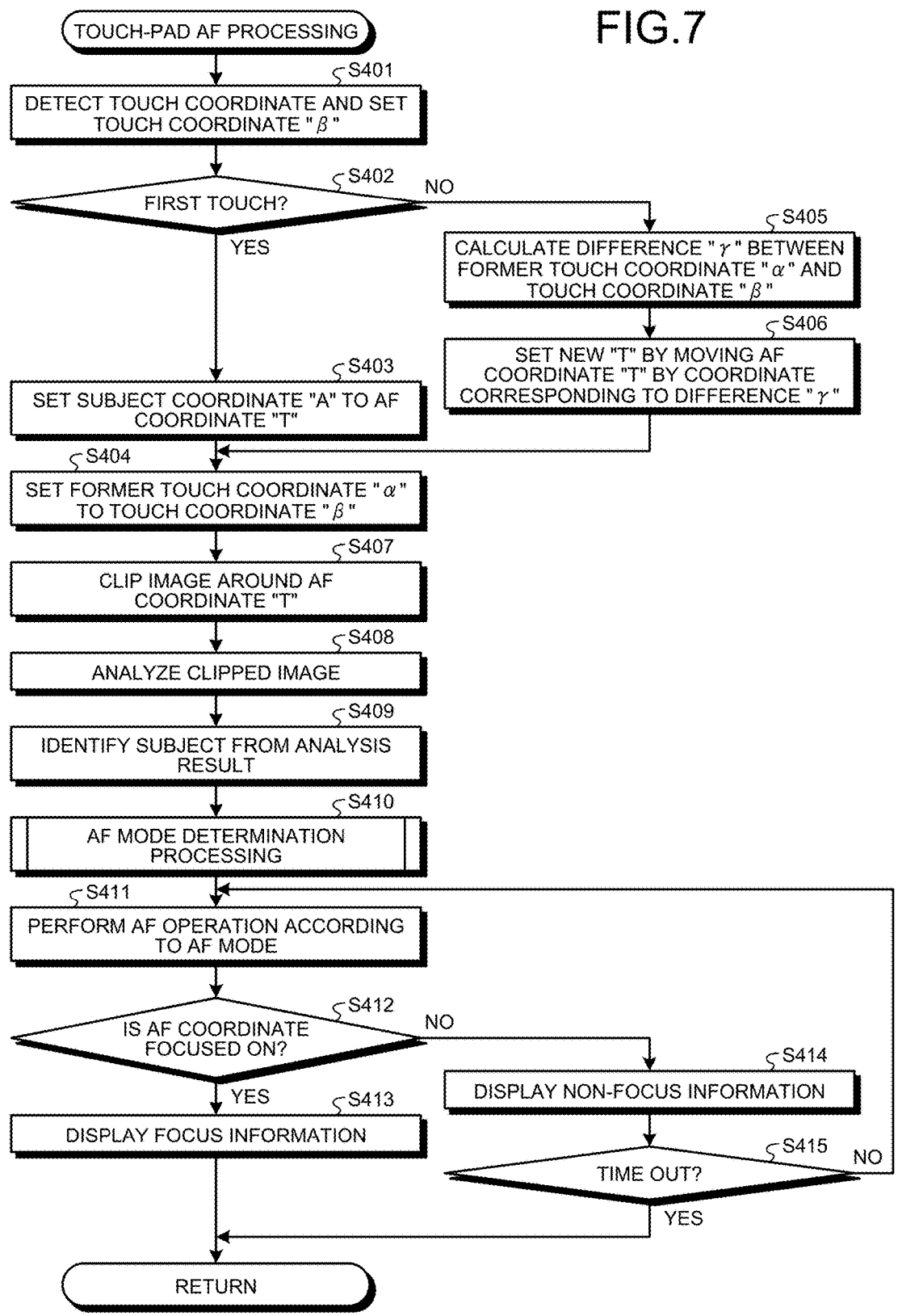
FIG. 7 is a flowchart illustrating an outline of touch-pad AF processing in FIG. 2.

FIG. 7 is a flowchart illustrating an outline of the touch-pad AF processing at Step S111 in FIG. 2.

As illustrated in FIG. 7, first, the input detection unit 146 detects a touch coordinate on the touch panel 9 and sets the touch coordinate as a touch coordinate "β" based on the coordinate signal input from the touch panel 9 (Step S401).

Figure 4C:
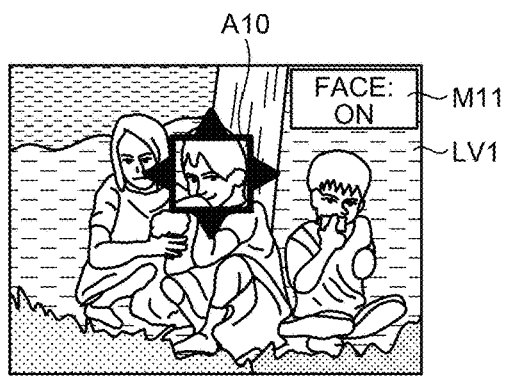
FIG. 4C is a schematic view for explaining an example of an image displayed by the first display unit included in the imaging apparatus according to the first embodiment.
Figure 8:
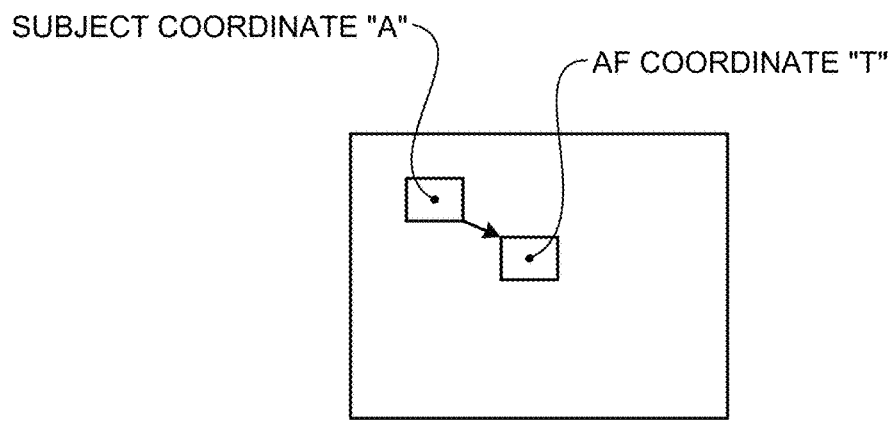
FIG. 8 is a schematic view for explaining an outline of operation for setting a subject coordinate "A" to an AF coordinate "T" by an input detection unit included in the imaging apparatus according to the first embodiment.

Subsequently, if the touch-pad operation is a first touch (Yes at Step S402), the input detection unit 146 outputs an operation signal for setting the subject coordinate "A" to the AF coordinate "T" to the imaging control unit 147 (Step S403). For example, as illustrated in FIG. 8, the input detection unit 146 outputs, to the imaging control unit 147, an operation signal for setting the subject coordinate "A" to the AF coordinate "T" by converting the touch coordinate "β" to a relative coordinate with the origin at the center of the predetermined area that is clipped by the image clipping unit 142. In this case, as illustrated in FIG. 4C, the imaging control unit 147 causes the AF target determination unit 144 to determine the focus frame A1 of the area including the face as a frame A10 of the AF target subject (FIG. 4B to FIG. 4C).

Figure 9:
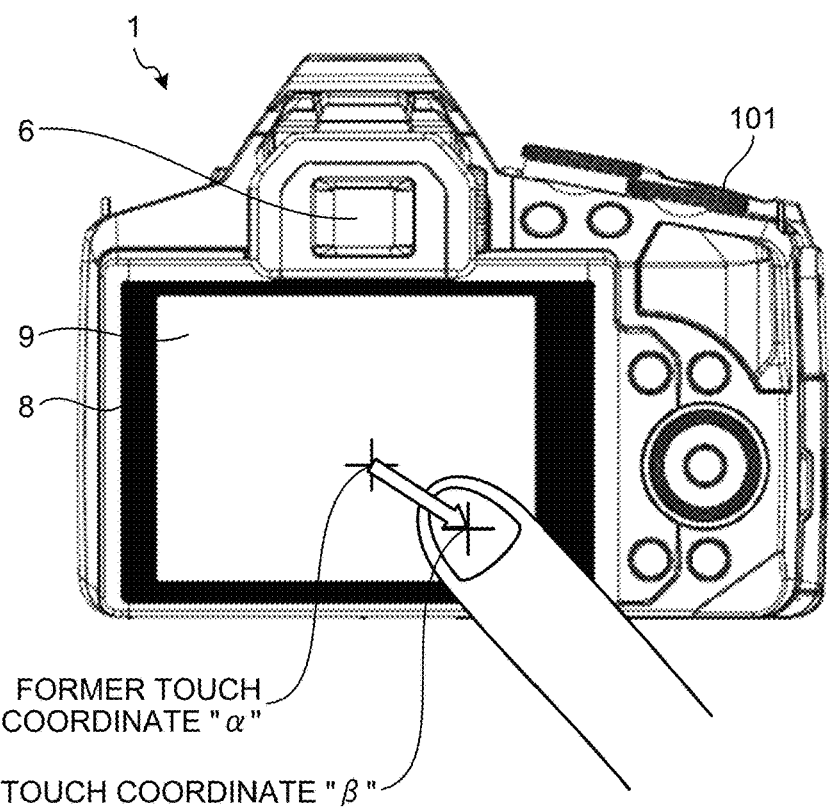
FIG. 9 is a schematic view for explaining operation performed on a touch panel of the imaging apparatus by a user.

Thereafter, the input detection unit 146 outputs an operation single for setting a former touch coordinate "α" to the touch coordinate "β" to the imaging control unit 147 (Step S404). Specifically, as illustrated in FIG. 9, the input detection unit 146 outputs the operation signal for setting the former touch coordinate "α" to the touch coordinate "β" to the imaging control unit 147. Here, the former touch coordinate "α" is a coordinate indicating a touch position that is previously touched on the touch panel 9 by the user. After Step S404, the imaging apparatus 1 proceeds to Step S407 to be described later.

At Step S402, if the touch-pad operation is not the first touch (No at Step S402), the input detection unit 146 calculates a difference between the former touch coordinate "α" and the touch coordinate "β" (Step S405).

Subsequently, the input detection unit 146 outputs, to the imaging control unit 147, an operation signal for setting a new coordinate "T" by moving the AF coordinate "T" by the coordinate corresponding to the above-described difference "γ" (Step S406). After Step S406, the imaging apparatus 1 proceeds to Step S404.

At Step S407, the imaging control unit 147 causes the image clipping unit 142 to generate an image by clipping an area including the AF coordinate "T" from the image corresponding to the image data generated by the imaging element 3, based on the operation signal input from the input detection unit 146.

Subsequently, the imaging control unit 147 causes the analyzing unit 143 to analyze the image clipped by the image clipping unit 142 (Step S408).

Thereafter, the imaging control unit 147 causes the AF target determination unit 144 to identify the subject based on an analysis result obtained through the analysis performed by the analyzing unit 143 (Step S409). Specifically, the AF target determination unit 144 determines the AF target subject to be focused on by the optical system 2 based on the analysis result obtained through the analysis performed by the analyzing unit 143.

Subsequently, the imaging control unit 147 causes the AF mode determination unit 145 to perform AF mode determination processing for determining the AF mode of the imaging apparatus 1 based on the analysis result obtained through the analysis performed by the analyzing unit 143 and a determination result obtained through the determination performed by the AF target determination unit 144 (Step S410). After Step S410, the imaging apparatus 1 proceeds to Step S411 to be described later.

Outline of AF Mode Determination Processing

Figure 10:
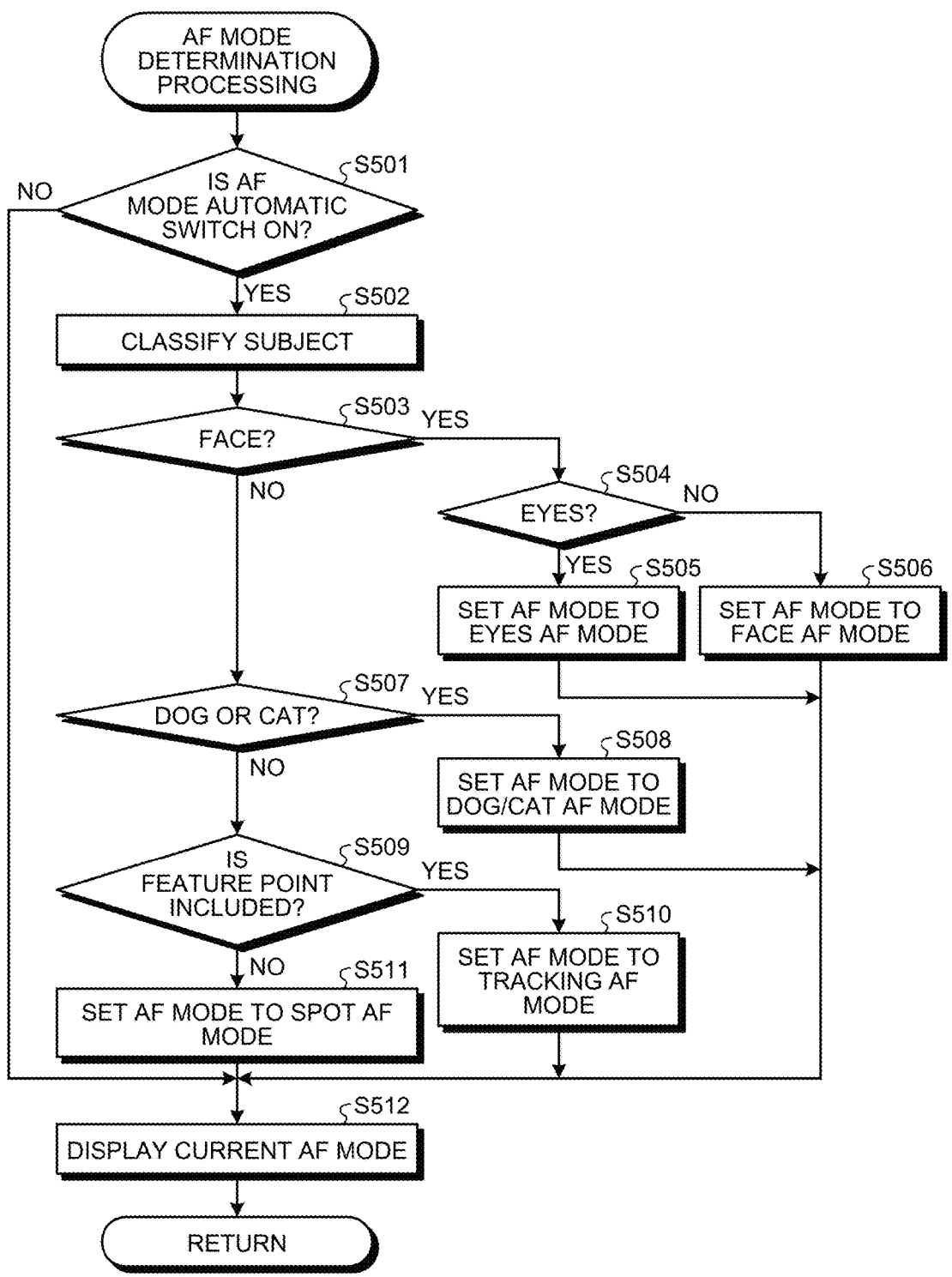
FIG. 10 is a flowchart illustrating an outline of AF mode determination processing in FIG. 7.

FIG. 10 is a flowchart illustrating an outline of the AF mode determination processing at Step S410 in FIG. 7.

As illustrated in FIG. 10, first, the imaging control unit 147 determines whether AF mode automatic switch, which causes the AF mode determination unit 145 to automatically switch the AF mode in accordance with the touch-pad operation, is enabled (Step S501). Specifically, the imaging control unit 147 determines whether setting information (for example, a flag is in an ON-state) for inhibiting control of switching the AF mode and the AF target according to the touch-pad operation is recorded in the SDRAM 11 upon input of a setting signal from the mode switch 103, and if the setting information is not recorded in the SDRAM 11, the imaging control unit 147 determines that the AF mode automatic switch is enabled. If the imaging control unit 147 determines that the AF mode automatic switch is enabled (Yes at Step S501), the imaging apparatus 1 proceeds to Step S502 to be described later. In contrast, if the imaging control unit 147 determines that the AF mode automatic switch is disabled (No at Step S501), the imaging apparatus 1 proceeds to Step S512 to be described later.

At Step S502, the AF mode determination unit 145 classifies the subject identified by the AF target determination unit 144. Specifically, the AF mode determination unit 145 classifies the subject identified by the AF target determination unit 144 based on a degree of match between the template for each of subjects recorded in the flash memory 12 and the subject identified by the AF target determination unit 144.

Subsequently, if the subject classified by the AF mode determination unit 145 is a human face (Yes at Step S503), and if the subject is human eyes (Yes at Step S504), the AF mode determination unit 145 determines an eyes AF mode, which is for causing the optical system 2 to focus on the eyes of the subject, as the AF mode of the imaging apparatus 1 (Step S505). After Step S505, the imaging apparatus 1 proceeds to Step S512 to be described later.

Figure 3D:
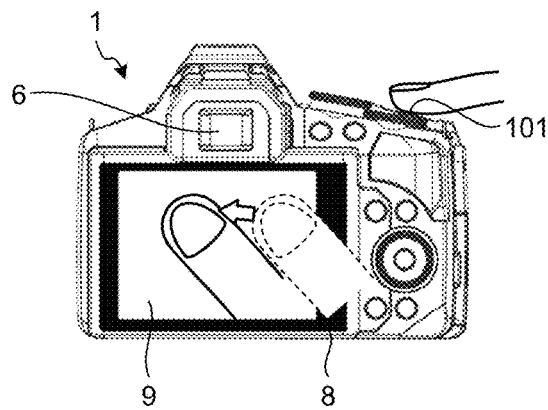
FIG. 3D is a schematic view for explaining operation performed on the imaging apparatus by the user.
Figure 4D:
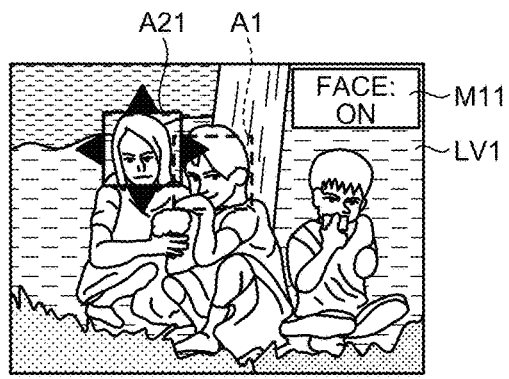
FIG. 4D is a schematic view for explaining an example of an image displayed by the first display unit included in the imaging apparatus according to the first embodiment.
Figure 4E:
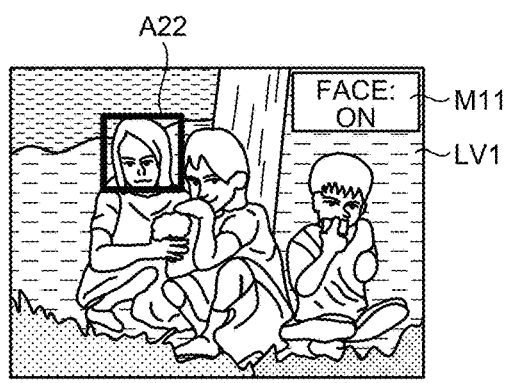
FIG. 4E is a schematic view for explaining an example of an image displayed by the first display unit included in the imaging apparatus according to the first embodiment.

At Step S503, if the AF mode determination unit 145 determines that the subject is a human face (Yes at Step S503), and if the subject is not human eyes (No at Step S504), the AF mode determination unit 145 determines the face AF mode, which is for causing the optical system 2 to focus on an area including the face of the subject, as the AF mode of the imaging apparatus 1 (Step S506). Specifically, as illustrated in FIG. 3D and FIG. 4D, when the user slides a touch position from the initial touch position toward the upper left on the touch panel 9 (FIG. 3C to FIG. 3D), and if the subject classified by the AF target determination unit 144 is a human face A21 (FIG. 4C to FIG. 4D), the AF mode determination unit 145 determines the face AF mode that is for causing the optical system 2 to focus on an area including the face of the subject. In this case, as illustrated in FIG. 4E, the display control unit 149 displays a frame A22 in a superimposed manner on the live view image LV1 on the first display unit 6. After Step S506, the imaging apparatus 1 proceeds to Step S512 to be described later.

At Step S503, if the subject classified by the AF mode determination unit 145 is not a human face (No at Step S503), the imaging apparatus 1 proceeds to Step S507 described below.

Subsequently, if the subject classified by the AF mode determination unit 145 is a dog or a cat (Yes at Step S507), the AF mode determination unit 145 determines a dog/cat AF mode, which is for causing the optical system 2 to focus on an area including a face of a dog or a cat serving as the subject, as the AF mode of the imaging apparatus 1 (Step S508). After Step S508, the imaging apparatus 1 proceeds to Step S512 to be described later.

At Step S507, if the subject classified by the AF mode determination unit 145 is not a dog or a cat (No at Step S507), the imaging apparatus 1 proceeds to Step S509 as described below.

At Step S509, if the subject classified by the AF mode determination unit 145 includes a feature point (Yes at Step S509), the AF mode determination unit 145 determines a tracking AF mode, which is for performing tracking while causing the optical system 2 to focus on the feature point, as the AF mode of the imaging apparatus 1 (Step S510). Here, the feature point is any one or more of a color, a shape, and a motion vector. After Step S510, the imaging apparatus 1 proceeds to Step S512 to be described later.

Figure 3E:
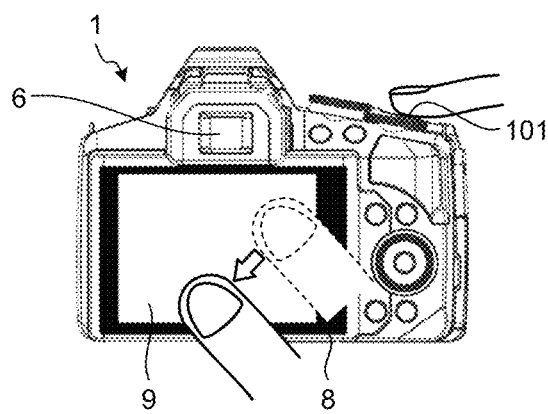
FIG. 3E is a schematic view for explaining operation performed on the imaging apparatus by the user.
Figure 4F:
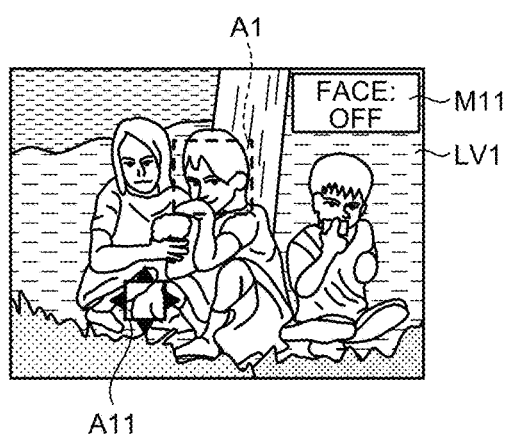
FIG. 4F is a schematic view for explaining an example of an image displayed by the first display unit included in the imaging apparatus according to the first embodiment.
Figure 4G:
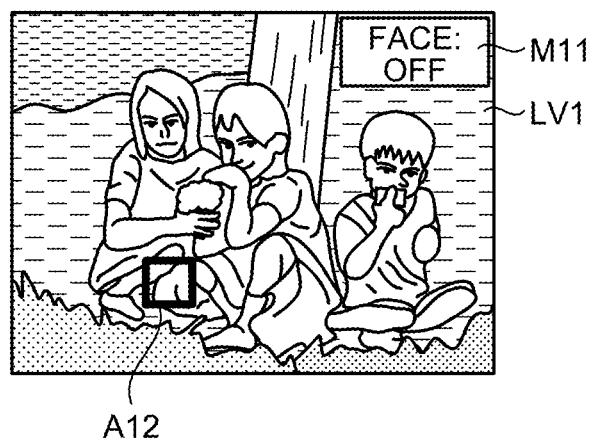
FIG. 4G is a schematic view for explaining an example of an image displayed by the first display unit included in the imaging apparatus according to the first embodiment.

At Step S509, if the subject classified by the AF mode determination unit 145 does not include a feature point (No at Step S509), the AF mode determination unit 145 determines a spot AF mode, which is for causing the optical system 2 to focus on an area that is specified according to the touch panel 9 or the operation input unit 10, as the AF mode of the imaging apparatus 1 (Step S511). Specifically, as illustrated in FIG. 3E and FIG. 4F, when the user slides the touch position from the initial touch position toward the lower left on the touch panel 9 (FIG. 3C to FIG. 3E), and if a subject A11 classified by the AF target determination unit 144 does not include a feature point (FIG. 4C to FIG. 4F), the AF mode determination unit 145 determines the spot AF mode as the AF mode of the imaging apparatus 1. In this case, as illustrated in FIG. 4G, the display control unit 149 displays a frame A12 in a superimposed manner on the live view image LV1 on the first display unit 6. After Step S511, the imaging apparatus 1 proceeds to Step S512 to be described later.

Figure 11A:
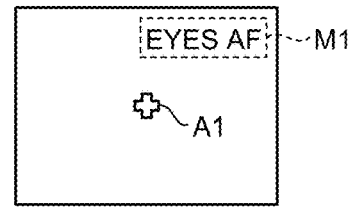
FIG. 11A is a schematic view illustrating an example of information displayed on the first display unit by a display control unit included in the imaging apparatus according to the first embodiment.
Figure 11B:
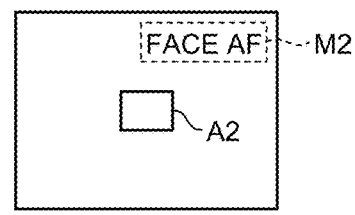
FIG. 11B is a schematic view illustrating an example of information displayed on the first display unit by the display control unit included in the imaging apparatus according to the first embodiment.
Figure 11C:
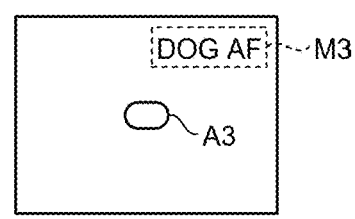
FIG. 11C is a schematic view illustrating an example of information displayed on the first display unit by the display control unit included in the imaging apparatus according to the first embodiment.
Figure 11D:
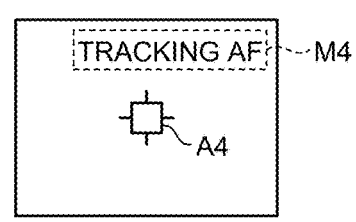
FIG. 11D is a schematic view illustrating an example of information displayed on the first display unit by the display control unit included in the imaging apparatus according to the first embodiment.
Figure 11E:
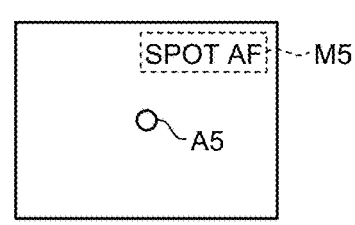
FIG. 11E is a schematic view illustrating an example of information displayed on the first display unit by the display control unit included in the imaging apparatus according to the first embodiment.

Subsequently, the display control unit 149 displays the focus frame and information on the AF mode in a superimposed manner on the live view image on the first display unit 6, based on the AF target determined by the AF target determination unit 144 and the current AF mode determined by the AF mode determination unit 145 (Step S512). For example, as illustrated in FIG. 11A to FIG. 11E, the display control unit 149 displays, on the first display unit 6, display mode names M1 to M5 related to the current AF mode and focus frames A1 to A5 based on the current AF target and the AF mode. For example, as illustrated in FIG. 11A, the display control unit 149 displays the mode name M1 (eyes AF) related to the current AF mode and the focus frame A1 corresponding to the AF mode on the first display unit 6. Accordingly, the user can intuitively recognize the current AF mode. After Step S512, the imaging apparatus 1 returns to a sub routine of the touch-pad AF processing in FIG. 7. In FIG. 11A to FIG. 11E, the display control unit 149 displays, on the first display unit 6, the focus frame while changing the size and the shape of the focus frame based on the AF target determined by the AF target determination unit 144 and the current AF mode determined by the AF mode determination unit 145, but the embodiments are not limited thereto. For example, it may be possible to display the focus frame in a different color based on the AF target determined by the AF target determination unit 144 and the current AF mode determined by the AF mode determination unit 145. It is of course possible for the display control unit 149 to appropriately combine the size, the shape, and the color of the focus frame.

Referring back to FIG. 7, processes from Step S411 will be described.

At Step S411, the imaging control unit 147 performs AF operation in accordance with the AF mode determined by the AF mode determination unit 145 by moving the optical system 2 along the optical axis L by driving the driving unit 5.

Subsequently, the AF determination unit 148 determines whether the imaging apparatus 1 is focusing on the AF coordinate "T" based on the image data generated by the imaging element 3 (Step S412). If the AF determination unit 148 determines that the imaging apparatus 1 is focusing on the AF coordinate "T" (Yes at Step S412), the imaging apparatus 1 proceeds to Step S413 to be described later. In contrast, if the AF determination unit 148 determines that the imaging apparatus 1 is not focusing on the AF coordinate "T" (No at Step S412), the imaging apparatus 1 proceeds to Step S414 to be described later.

At Step S413, the display control unit 149 displays, on the first display unit 6, focus information, which indicates that the imaging apparatus 1 is focusing on the AF coordinate "T", in a superimposed manner on the live view image displayed on the first display unit 6. For example, if the AF mode of the imaging apparatus 1 is the face AF mode, the display control unit 149 displays a frame indicating an area including the face in a superimposed and highlighted manner on the live view image on the first display unit 6 (for example, a black frame is changed to a red frame as highlighted display). Accordingly, the user can intuitively recognize that the imaging apparatus 1 is focusing on the AF coordinate "T". The imaging apparatus 1 may give a notice indicating that the AF coordinate "T" is focused on by using sound or the like in addition to the display. After Step S413, the imaging apparatus 1 returns to the main routine in FIG. 2 described above.

At Step S414, the display control unit 149 displays, on the first display unit 6, non-focus information, which indicates that the imaging apparatus 1 is not focusing on the AF coordinate "T", in a superimposed manner on the live view image displayed on the first display unit 6. For example, when the AF mode of the imaging apparatus 1 is set to the face AF mode, the display control unit 149 displays only a frame indicating an area including the face in a superimposed manner on the first display unit 6 (for example, only a black frame is displayed). Accordingly, the user can intuitively recognize that the imaging apparatus 1 is not focusing on the AF coordinate "T".

Subsequently, if a predetermined time has elapsed after the imaging apparatus 1 has performed the AF processing (Yes at Step S415), the imaging apparatus 1 returns to the main routine in FIG. 2 described above. In contrast, if the predetermined time has not elapsed after the imaging apparatus 1 has performed the AF processing (No at Step S415), the imaging apparatus 1 returns to Step S411 described above.

Referring back to FIG. 2, processes from Step S112 will be described.

Subsequently, if the touch-pad operation is maintained on the touch panel 9 (Yes at Step S112), the imaging apparatus 1 returns to Step S111 described above.

Figure 3F:
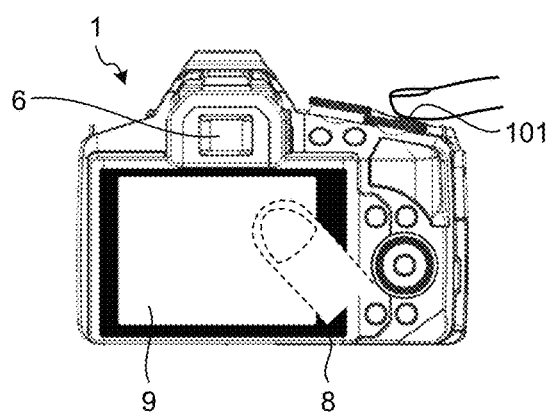
FIG. 3F is a schematic view for explaining operation performed on the imaging apparatus by the user.

At Step S112, if the touch-pad operation is not maintained on the touch panel 9 (No at Step S112), the imaging apparatus 1 proceeds to Step S113 to be described later. Specifically, as illustrated in FIG. 3F, when the user releases the finger from the touch panel 9, that is, when sequential output of the coordinate signals from the touch panel 9 is stopped, the imaging apparatus 1 proceeds to Step S113 described below.

At Step S113, the control unit 14 records various kinds of information on the current AF target, the AF mode, and the AF coordinate "T" in the SDRAM 11. After Step S113, the imaging apparatus 1 returns to Step S105 described above.

According to the first embodiment as described above, the imaging control unit 147 performs control of moving a position of a predetermined area to be clipped from an image by the image clipping unit 142 based on the operation signal output by the input detection unit 146, and thereafter, causes the analyzing unit 143 to analyze the predetermined area of the latest image generated by the imaging element 3, causes the AF target determination unit 144 to determine an AF target, and causes the AF mode determination unit 145 to select and determine an optimal AF mode. Therefore, it is possible to specify a desired subject by blind operation, and it is also possible to automatically switch to the optimal AF mode in conjunction with the specified subject.

Further, according to the first embodiment, the display control unit 149 synthesizes the focus frame that is based on the AF mode and the AF target with the live view image, and displays the focus frame and the live view image on the first display unit 6. Therefore, it is possible to allow the user to intuitively recognize the AF mode and the AF target that are results of touch-pad operation using the blind operation on the touch panel 9.

Furthermore, according to the first embodiment, when the setting information for inhibiting control of switching the AF mode and the AF target according to the touch-pad operation is recorded in the SDRAM 11, the imaging control unit 147 inhibits the AF mode determination unit 145 from automatically switching the AF mode. Therefore, even when a subject that is not desired by a user, e.g., a face of a subject that is not desired by the user, is detected, it is possible to prevent the AF mode from being automatically switched to an AF mode that is not desired by the user.

Moreover, according to the first embodiment, the input detection unit 146 outputs an operation signal that is obtained by converting the coordinate signal output by the touch panel 9 to a relative coordinate with the origin at the predetermined area. Therefore, even when it is difficult to directly operate an operating member of the operation input unit 10, e.g., even when imaging is performed while checking an image using the first display unit 6, it is possible to focus on a desired subject by a pointing designation operation on the image using operation of designating a relative position through the touch-pad operation. Consequently, it is possible to improve the operability.

Furthermore, according to the first embodiment, the input detection unit 146 outputs an operation signal that is obtained by converting the coordinate signal output by the touch panel 9 to a relative coordinate with the origin at the predetermined area. Therefore, even when it is difficult to specify a desired subject due to the size of a finger of a user, or the like, it is possible to easily specify the desired subject. Moreover, when a subject is specified using a directional pad or a jog dial, it is possible to instantaneously move an AF point to a desired subject as compared to a method in which known AF points are sequentially moved. Therefore, it is possible to designate a desired subject with simple operation.

In the first embodiment, in a case where the imaging control unit 147 performs control of causing the AF mode determination unit 145 to switch to an AF mode corresponding to the subject in response to the touch-pad operation, the imaging control unit 147 may perform control of causing the AF mode determination unit 145 to return to a previous AF mode, which has been adopted before the first release signal has been input, when the user releases the half-pressed state of the release switch 101 (the first state). It is of course possible for the imaging control unit 147 to perform control of causing the AF mode determination unit 145 to return to the previous AF mode, which has been adopted before the first release signal has been input, when the user fully presses the release switch 101 (state transition to the second state) to output the second release signal and the imaging apparatus 1 terminates imaging. With this operation, it is possible to return the imaging apparatus 1 to the original state by only temporarily switching the AF mode in accordance with the touch-pad operation when image composition check is completed or when imaging is terminated.

Further, in the first embodiment, a case has been described in which a still image is captured, but the embodiments are not limited thereto. The present disclosure is applicable to a case in which a moving image is captured. In this case, the imaging control unit 147 may perform the AF processing when a finger is released from the touch panel 9. With this configuration, it is possible to omit unnecessary AF operation in the case of capturing a moving image. Consequently, it is possible to smoothly focus on a desired subject.

Furthermore, in the first embodiment, the display control unit 149 may change at least any one or more of the size, the shape, and the color of the focus frame, which is superimposed on the live view image on the first display unit 6, based on the AF mode and the AF target. With this configuration, it is possible to intuitively recognize the current AF mode and the AF target.

Second Embodiment

Next, a second embodiment will be described. An imaging apparatus of the second embodiment has the same configuration as that of the imaging apparatus 1 of the first embodiment described above, but performs different processing. In the following, processing performed by the imaging apparatus according to the second embodiment will be described. The same components as those of the imaging apparatus 1 of the first embodiment described above will be denoted by the same reference signs, and explanation thereof will be omitted.

Processing Performed by Imaging Apparatus

Figure 12:
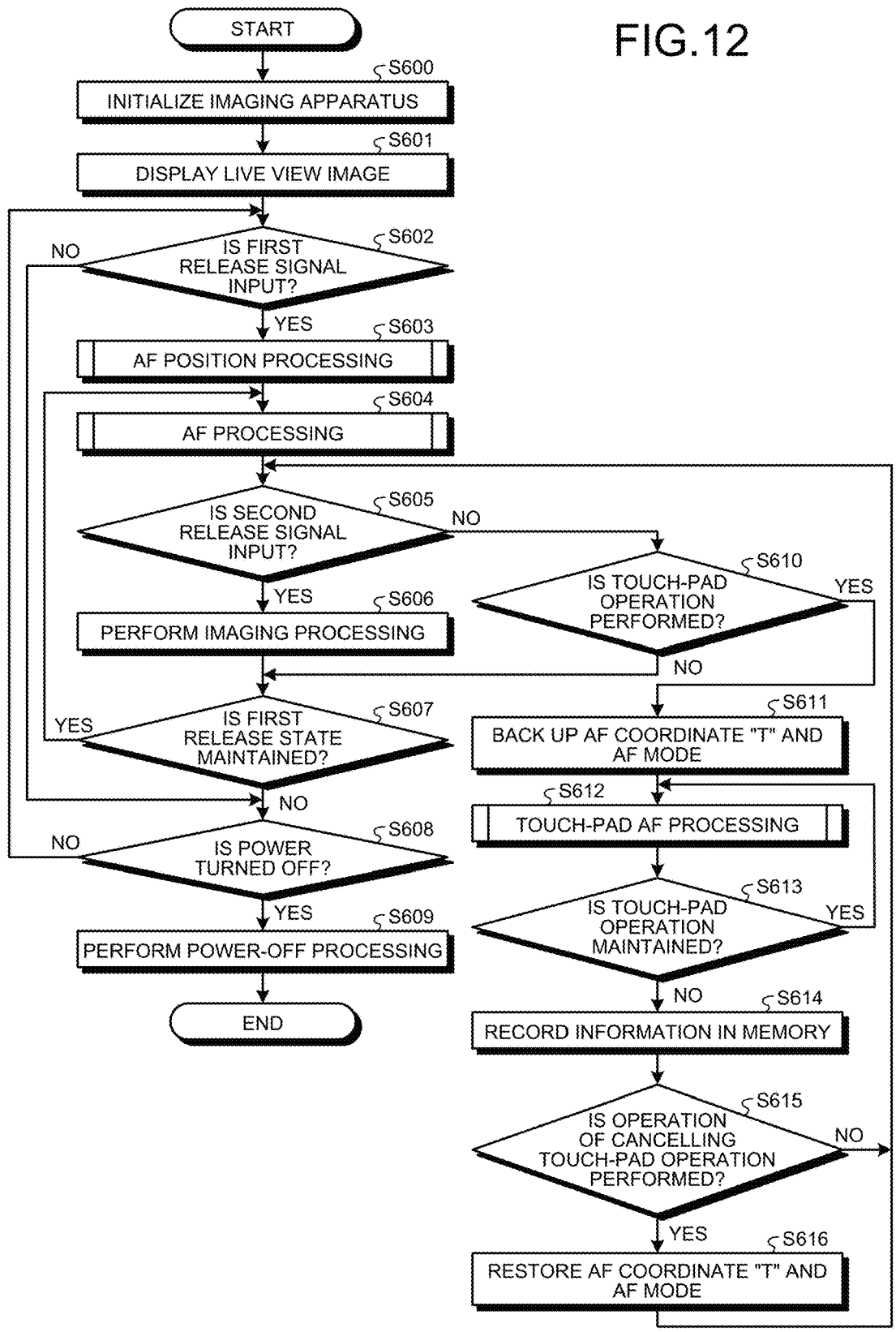
FIG. 12 is a flowchart illustrating an outline of processing performed by an imaging apparatus according to a second embodiment.

FIG. 12 is a flowchart illustrating an outline of processing performed by the imaging apparatus 1 according to the second embodiment. In FIG. 12, processing performed when a user performs imaging while viewing a live view image displayed on the first display unit 6 will be described.

Step S600 to Step S610 in FIG. 12 respectively correspond to Step S100 to Step S110 in FIG. 2 described above.

At Step S611, the control unit 14 performs backup by recording the AF coordinate "T" and the AF mode, which are currently set in the imaging apparatus 1, in the SDRAM 11. After Step S611, the imaging apparatus 1 proceeds to Step S612 described below.

Step S612 to Step S614 respectively correspond to Step S111 to Step S113 in FIG. 2 described above. After Step S614, the imaging apparatus 1 proceeds to Step S615.

At Step S615, if a cancel signal for cancelling the touch-pad operation is input from the cancel switch 102 (Yes at Step S615), the AF mode determination unit 145 restores the AF coordinate "T" and the AF mode that have been set before the user has performed the touch-pad operation (Step S616). Specifically, the AF mode determination unit 145 acquires the AF coordinate "T" and the AF mode, which have been recorded in the SDRAM 11 before the user has performed the touch-pad operation, and restores the AF coordinate "T" and the AF mode that have been set before the user has performed the touch-pad operation. With this operation, even when a change to a certain position or an AF mode that are not desired by the user is performed through the touch-pad operation, it is possible to instantaneously return to the state that has been adopted before the touch-pad operation. After Step S616, the imaging apparatus 1 returns to Step S605.

At Step S615, if the cancel signal for cancelling the touch-pad operation is not input from the cancel switch 102 (No at Step S615), the imaging apparatus 1 returns to Step S605.

According to the second embodiment as described above, if the cancel signal for cancelling the touch-pad operation is input from the cancel switch 102 (Yes at Step S615), the AF mode determination unit 145 restores the AF coordinate "T" and the AF mode that have been set before the user has performed the touch-pad operation. Therefore, even when a change to a certain position or an AF mode that are not desired by the user is performed through the touch-pad operation, it is possible to instantaneously return to the state that has been adopted before the touch-pad operation.

Other Embodiments

The imaging apparatus according to the present disclosure is applicable to a camcorder, a digital video camera, a mobile phone with an imaging function, a table electronic device with an imaging function, a security camera, a microscope system that is operated through a touch panel that is provided on a display unit for displaying an image corresponding to image data captured by a microscope, an endoscope system that is operated through a touch panel provided on a display unit for displaying an image corresponding to image data captured by an endoscope, or the like, instead of a digital still camera. When the present disclosure is applied to a microscope system, a focus mechanism is moved along a vertical direction when a user performs blind operation on the touch panel while viewing a monitor. Further, when the present disclosure is applied to an endoscopic system, e.g., an ultrasound endoscope system, it may be possible to relatively move a region of interest in accordance with blind operation when a user performs the blind operation on the touch panel while viewing a monitor. It is of course possible to apply the present disclosure to even an endoscope system, such as a rigid endoscope or an endoscope for digestive organs, which is capable of performing the AF processing.

The programs to be executed by the imaging apparatus according to the present disclosure are provided by being recorded, as file data in an installable format or executable format, on a computer-readable recording medium, such as a compact disk read only memory (CD-ROM), a flexible disk (FD), a CD-recordable (CD-R), a digital versatile disk (DVD), a universal serial bus (USB) medium, or a flash memory.

In the description of the flowchart in this specification, context of the processes among the steps has been indicated using expressions, such as "first", "thereafter", and "subsequently", but the sequences of the processes needed for implementing the present disclosure are not intended to be uniquely defined by these expressions. In other words, the order of processes in the flowchart illustrated in this specification may be changed within a range without contradiction.

The disclosure is not limited to the above-described embodiments as they are. In the implementation stage, the disclosure may be embodied with various modifications of the constituent elements within the scope not departing from the gist of the disclosure. In addition, various inventions may be made by appropriately combining a plurality of constituent elements disclosed in the above embodiments. For example, some constituent elements may be deleted from all of the constituent elements described in the embodiments and the modifications described above. Furthermore, the constituent elements described in the embodiments may be appropriately combined.

Moreover, in the specification or the drawings, a term that is at least once described together with a different term having a broader meaning or the same meaning may be replaced with the different term at any point in the specification or the drawings. Thus, various modifications and applications may be made without departing from the scope of the disclosure.

The disclosure may include various embodiments that are not described herein, and various design changes or the like may be made within a range of a certain technical idea that may be specified herein.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an image sensor configured to successively image a subject and sequentially generate image data;
   a control circuit configured to clip a predetermined area that is set in advance from each of images corresponding to the image data sequentially generated by the image sensor,
   analyze the predetermined areas sequentially clipped and generate an analysis result indicating an identified subject,
   determine an AF target in the images based on the analysis result generated, and
   select and determine an optimal AF mode from among a plurality of AF modes set in advance, based on the analysis result generated and a determination result of determination performed; and
   a touch panel configured to detect a touch position of an external object and output a coordinate signal indicating the touch position, wherein the control circuit is further configured to
   output an operation signal that is obtained by converting the coordinate signal output by the touch panel to a relative coordinate with an origin at the predetermined area, and
   repeat, every time the touch panel outputs the coordinate signal in accordance with a change in the touch position, control of moving a position of the predetermined area to be clipped from the images by the image clipping unit based on the operation signal output, and thereafter, analyze the predetermined area of a latest image corresponding to latest image data generated by the image sensor, to determine the AF target, and to select and determine the optimal AF mode.

2. The imaging apparatus according to claim 1, further comprising:
   a first display panel configured to display the images, wherein the control circuit is further configured to synthesize a focus frame that is based on the AF mode and the AF target with the images, and display the focus frame and the images on the first display panel.

3. The imaging apparatus according to claim 2, wherein the control circuit is further configured to switch any one or more of a size, a shape, and a color of the focus frame based on the AF mode and the AF target, and display the changed focus frame on the first display panel.

4. The imaging apparatus according to claim 2 further comprising:
   a detection sensor arranged in a vicinity of the first display panel and configured to detect an externally approaching user; and
   a second display panel including a larger display area than a display area of the first display panel and configured to display the images, wherein
   the touch panel is superimposed on the display area of the second display panel,
   the first display panel includes a display panel that displays the images and an enlarging optical system that enlarges the images displayed on the display panel, and
   the control circuit displays the images on the first display panel when the detection sensor detects the user, and displays the images on the second display panel when the detection sensor does not detect the user.

5. The imaging apparatus according to claim 1, further comprising:
   at least one switch configured to receive input of a setting signal for inhibiting the control performed by the control circuit, wherein
   the control circuit inhibits the control when the setting signal is input from the at least one switch and if the touch panel outputs the coordinate signal in accordance with a change in the touch position.

6. The imaging apparatus according to claim 1, further comprising:
   at least one switch configured to receive input of a cancel signal for cancelling the AF target and the AF mode after the control circuit has performed the control, wherein
   when the control circuit outputs the operation signal and performs the control, and if the cancel signal is input from the at least one switch, returns the AF target and the AF mode to an AF target and an AF mode that have been used before the control has been performed.

7. An imaging method implemented by an imaging apparatus, the imaging method comprising:
   successively imaging a subject and sequentially generating image data;
   detecting a touch position of an external object and outputting a coordinate signal indicating the touch position;
   clipping a predetermined area that is set in advance from each of images corresponding to the image data sequentially generated at the imaging;
   analyzing the predetermined areas sequentially clipped at the clipping and generating an analysis result indicating an identified subject;
   determining an autofocus (AF) target based on the analysis result generated at the generating;
   selecting and determining an optimal AF mode from among a plurality of AF modes set in advance, based on the analysis result generated at the generating and a determination result obtained at the determining;
   outputting an operation signal, which is obtained by converting the coordinate signal to a relative coordinate with an origin at a center of the predetermined area, when the coordinate signal is output at the outputting; and
   repeatedly performing switching control of moving a position of the predetermined area to be clipped from the images at the clipping based on the operation signal output at the outputting, and thereafter, analyzing the predetermined area of a latest image corresponding to latest image data generated at the generating, determining the AF target, and selecting and determining the optimal AF mode, every time the image data is generated at the generating.

8. A non-transitory computer-readable recording medium on which an executable program is recorded, the program instructing a processor included in an imaging apparatus to execute:

successively imaging a subject and sequentially generating image data;

detecting a touch position of an external object and outputting a coordinate signal indicating the touch position;

clipping a predetermined area that is set in advance from each of images corresponding to the sequentially generated image data;

analyzing the sequentially clipped predetermined areas and generating an analysis result indicating an identified subject;

determining an autofocus (AF) target based on the analysis result;

selecting and determining an optimal AF mode from among a plurality of AF modes set in advance, based on the analysis result and a determination result obtained at the determining;

outputting an operation signal, which is obtained by converting the coordinate signal to a relative coordinate with an origin at a center of the predetermined area, when the coordinate signal is output; and repeatedly performing switching control of moving a position of the predetermined area to be clipped from the images based on the operation signal, and thereafter, analyzing the predetermined area of a latest image corresponding to latest image data generated at the generating, determining the AF target, and selecting and determining the optimal AF mode, every time the image data is generated.

* * * * *